US006689207B2

(12) United States Patent
Espinosa et al.

(10) Patent No.: US 6,689,207 B2
(45) Date of Patent: Feb. 10, 2004

(54) METHOD AND PLANT FOR MAKING ALUMINA CEMENT AND ALUMINA CEMENT

(75) Inventors: Bruno Espinosa, Genas (FR); Thomas Bier, Freiberg (DE)

(73) Assignee: LafargeSaluminates, Paris (FR)

( * ) Notice: Subject to any disclaimer, the term of this patent is extended or adjusted under 35 U.S.C. 154(b) by 0 days.

(21) Appl. No.: 10/200,146

(22) Filed: Jul. 23, 2002

(65) Prior Publication Data

US 2003/0070587 A1 Apr. 17, 2003

Related U.S. Application Data

(63) Continuation-in-part of application No. 09/530,918, filed as application No. PCT/FR97/01998 on Nov. 6, 1997, now abandoned.

(51) Int. Cl.$^7$ .................................. C04B 7/32
(52) U.S. Cl. ...................... 106/692; 106/693
(58) Field of Search .................. 106/692, 693

(56) References Cited

U.S. PATENT DOCUMENTS

| | | | |
|---|---|---|---|
| 1,643,137 | A | 9/1927 | Spackman |
| 3,963,508 | A | 6/1976 | Masaryk |
| 4,116,707 | A | 9/1978 | Oborin et al. |
| 4,396,422 | A | 8/1983 | Matsuno et al. |

FOREIGN PATENT DOCUMENTS

| | | |
|---|---|---|
| DE | 2 152 410 | 5/1972 |
| DE | 26 49 032 | 4/1978 |
| DE | 233 836 | 3/1986 |
| GB | 2 033 369 | 5/1980 |

OTHER PUBLICATIONS

By J. Bensted, "High alumina cement—Present state of knowledge", *ZKG International*, vol. 46, Sep. 9, 1993, pp. 560–566.

*Primary Examiner*—Helene Klemanski
(74) *Attorney, Agent, or Firm*—Young & Thompson

(57) ABSTRACT

The concentration d3 is alumina $AL_2O_3$, —A—, and the concentration d4 in lime CaO, —C—, in the initial mixture are such that d3/d4 ranges between 1.15 and 1.40. Grinding produces a cement with a size distribution as represented in a Rosin Rammler diagram has a gradient ranging between 0.75 and 0.90.

6 Claims, 5 Drawing Sheets

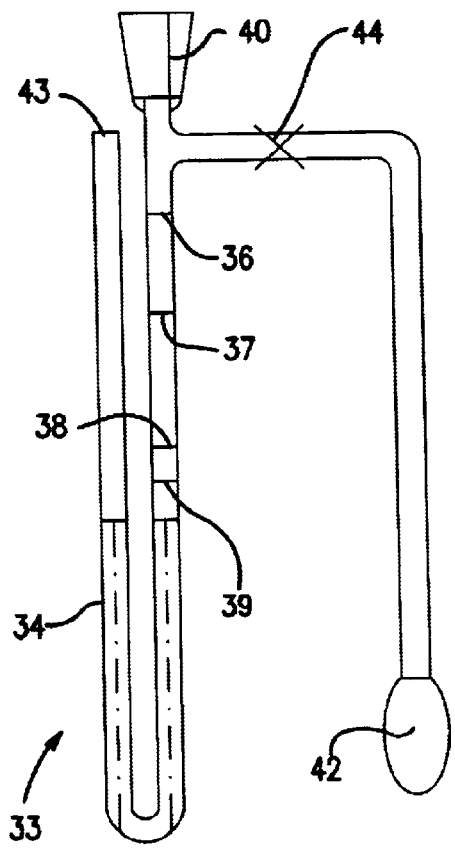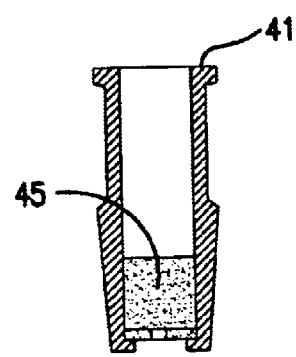
FIG. 5B
FIG. 5A

METHOD AND PLANT FOR MAKING ALUMINA CEMENT AND ALUMINA CEMENT

This application is a continuation-in-part division of application Ser. No. 09/530,918, filed on Aug. 1, 2000 now abandoned appliction Ser. No. 09/530,918 is the national phase of PCT International Application No. PCT/FR97/01998 filed on Nov. 6, 1997 under 35 U.S.C. §371. The entire contents of each of the above-identified applications are hereby incorporated by reference.

FIELD OF THE INVENTION

The invention concerns a method for making alumina cement and alumina cement.

Alumina cement is traditionally made from a mixture of bauxite and limestone. The components of this mixture are sometimes crushed and ground then homogenised. This depends on the type of furnace used.

BACKGROUND OF THE INVENTION

The batch composition thus obtained is baked at high temperature, close to 1500 degrees, in a furnace in order to form the clinker.

This clinker is then ground, whereas secondary constituents may be added to form the cement that is then routed to its place of usage.

We know that the clinker produced for the manufacture of alumina cement comprises alumina oxide $Al_2O_3$, represented in the abbreviated notation in the cement industry as A, and lime CaO represented in the same cement industry by the abbreviated notation C. This notation will be used at a later stage for easier reading of this text. The alumina oxide and the lime are crystallised partially in the form $C_{12}A_7$ on the one hand and in the form CA on the other.

According to the nature of the initial mixture, the alumina cement is more or less ferriferous.

Alumina cement is considered in the building chemistry as a raw material that, associated with other components, provides ready-made products such as concrete, mortar, glue, binder and plaster for the manufacture of slabs or cast objects or more generally for any concrete, mortar or plaster.

Seeking improvement in the qualities of the ready-made products leads to the formulation of products that would associate, to alumina cement, lime, Portland cement, calcium sulphate, as well as a number of additives or assistants.

It has also appeared that the quality of the ready-made products highly depends on the properties and on the quality of alumina cement.

Optimised alumina cement enables extending the workability of a mortar, as well as increasing its fluidity, while maintaining very quick hardening kinetics.

SUMMARY OF THE INVENTION

In other words, the ready-made product using this kind of cement will be applicable for a longer time, but it will achieve final performances at least as rapidly.

The properties of alumina cements are more particularly expressed by the initial and final setting, the flow value in percentage, the resistance after 6 hours and the resistance after 24 hours.

The purpose of the invention is therefore the production of specific alumina cement whose properties enable the realisation of high quality ready-made products.

To this end, the invention concerns a method for making alumina cement as defined above wherein the concentration d3 in alumina $Al_2O_3$, —A— and the concentration d4 in lime CaO, —C— in the initial mixture are such that d3/d4 ranges between 1.15 and 1.40, and grinding produces a cement with size distribution as represented in a Rosin Rammler diagram that has a gradient ranging between 0.75 and 0.90. In the invention, the concentration d3 represents the percentage by weight of $Al_2O_3$ in the initial mixture, and the concentration d4 represent the percentage by weight of CaO in the initial mixture.

The combination of the mineralogical properties of the initial composition and of the chemical properties of the clinkers with particular size distribution enables reaching the expected results, independently from the other conventional operating conditions of the process. Therefore, while improving the properties of alumina cement, higher quality ready-made products are obtained.

Controlling the relative concentration in alumina d3 and in lime d4 in the initial mixture, whereas the ratio of these concentrations d3/d4 ranges between 1.15 and 1.40 and the firing process takes place under oxidising atmosphere, enables low concentration of $C_{12}A_7$ in the clinker.

The invention also relates to a plant for making alumina cement implementing the method defined above. Firing under oxidising atmosphere, if any, can take place in a reverberatory furnace, a rotary furnace or still an electric furnace. Conversely, the usual firing conditions are reducing conditions leading to high $C_{12}A_7$ content.

The invention also concerns an alumina cement wherein the concentration d3 in alumina, —A— and the concentration d4 in lime, —C— are such that d3/d4 ranges between 1.15 and 1.40, and whose size distribution as represented in a Rosin Rammler diagram has a gradient ranging between 0.75 and 0.90.

The Blaine fineness of the cement ranges preferably between 2,000 and 5,000 $cm^2/g$, advantageously around 3,500 $cm^2/g$.

BRIEF DESCRIPTION OF THE DRAWINGS

Certain embodiments of the invention will be described below in detail with reference to the examples and to the appended figures on which:

FIG. 5 is a schematic representation of the device implemented for determining the fineness of the cement by air-permeability (Blaine method);

DETAILED DESCRIPTION OF THE INVENTION

Figure 1:
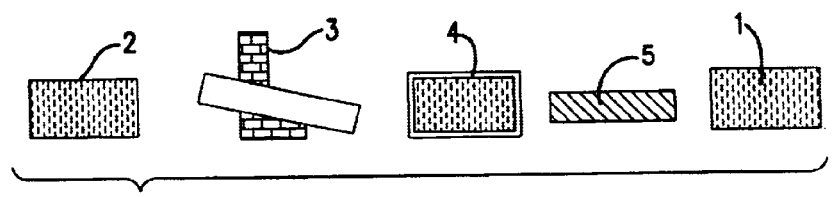
FIG. 1 is a very sketchy representation of a method for making alumina cement, according to prior art.

Conventionally, as represented on FIG. 1, alumina cement 1 is obtained from a stock of raw material 2 consisting essentially of a mixture of bauxite and limestone that may have been crushed, baked in a furnace 3. The clinker thus produced is kept in a store 4, then ground by the grinder 5.

This method of manufacture is given for exemplification purposes, whereas methods for making alumina cement by sintering can also prove quite satisfactory.

Figure 2:
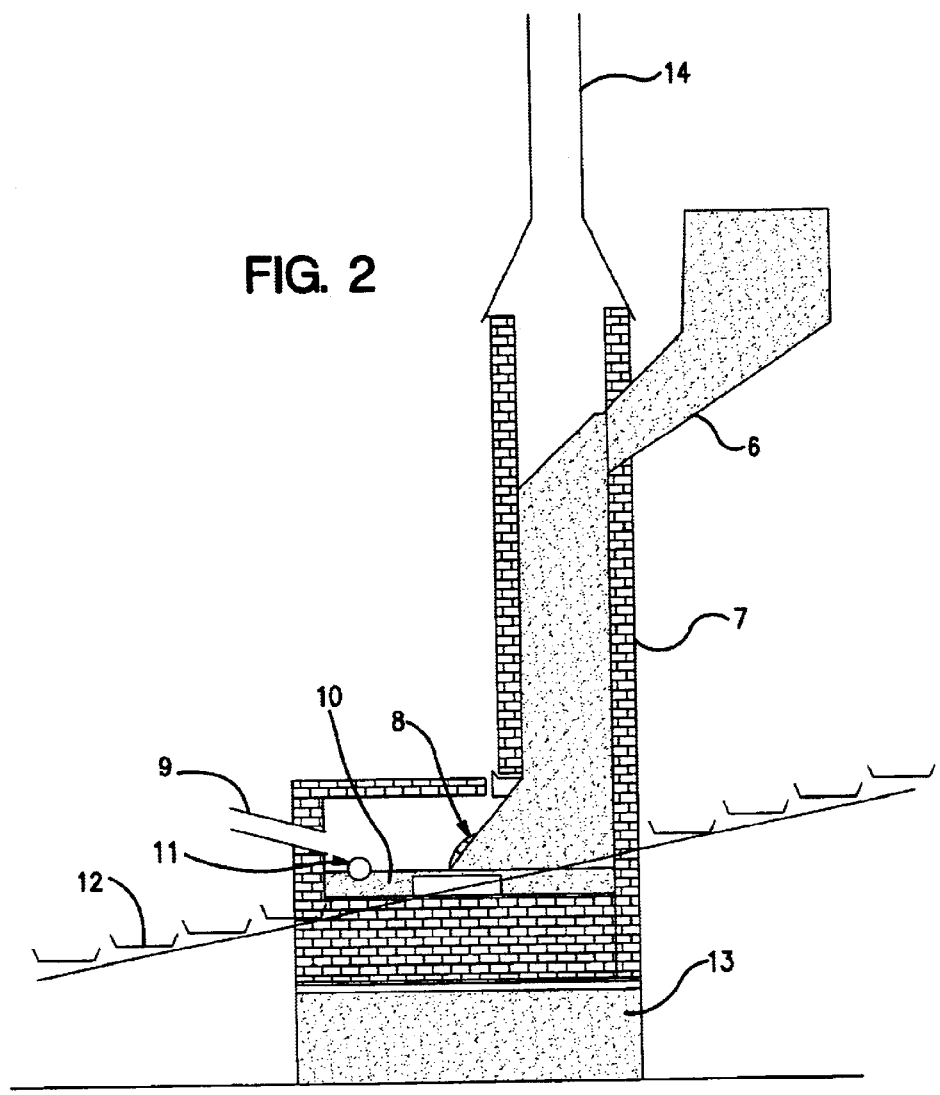
FIG. 2 is a schematic representation of a reverberatory furnace.

The furnace 3 is advantageously a reverberatory furnace as represented on FIG. 2. The raw materials making up the unbaked material originating from the stock 2 are loaded into the feeding hopper 6 at the upper section of the vertical element 7 of the furnace. The unbaked material forms thus a slope 8 that is brought to high temperature, around 1,500 degrees by means of the nozzle 9 and produces the cast 10 that is evacuated through the nose 11 in the moulds 12. The furnace rests on a concrete plinth 13 and the fumes are evacuated through the chimney 14.

The reverberatory furnace has been described in detail for exemplification purposes. However, similar results can be obtained and the same parameters can be controlled by using another furnace such as, for instance, a tunnel furnace or an electrical furnace, with an induction or electrical arc system.

Figure 3:
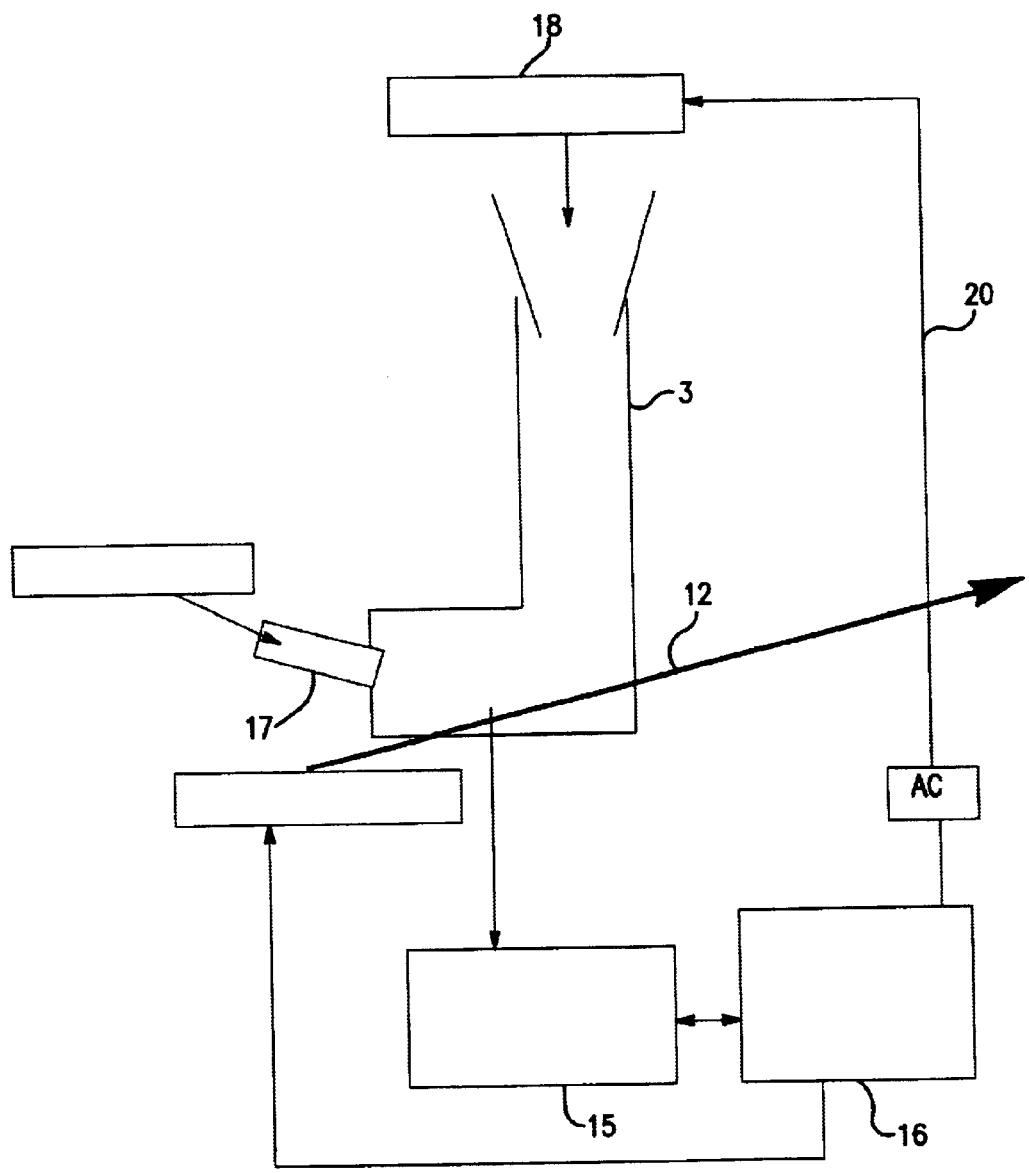
FIG. 3 is a schematic representation of the operating conditions of the reverberatory furnace of FIG. 2.

The operation of the furnace is more particularly represented on the diagram of FIG. 3. The quality of the clinker obtained is controlled by Theological analyses symbolised in 15 as well as chemical and mineralogical analyses symbolised in 16. A fluorescent analysis X enables following the ratio of the concentration in alumina d3 in relation to the concentration in lime d4 in the clinker. This concentration is controlled while modifying, when it is necessary, the composition of the raw material (of the unbaked stock).

A regulation loop 20 is thereby provided, enabling to control the chemical composition of the clinkers.

It has been shown that keeping a concentration ratio d3/d4 ranging between 1.15 and 1.40 maintains the concentration ratio in $C_{12}A_7$ d1 and in CA d2 at a value d1/d2 smaller than 0.09. These values d1 and d2 come from X-Ray Diffraction analysis, more precisely from the direct comparison of the peak intensities of each phase at their main diffraction angle. The ratio d1/d2 is linked to a weight ratio. The advantage of the invention is that d3/d4 ranging between 1.15 and 1.40 leads to d1/d2 at least divided by two compared to alumina cements according to the prior art (Fondu® for instance).

Figure 4:
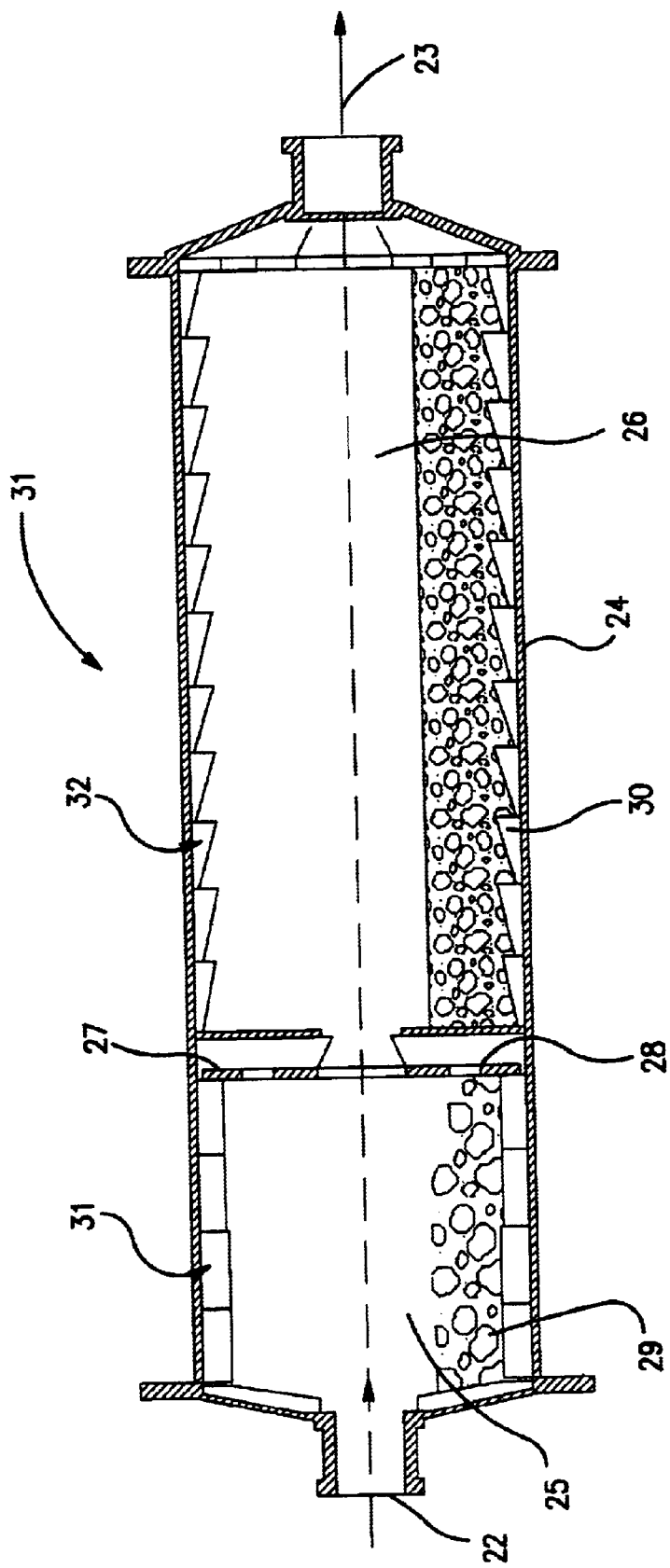
FIG. 4 is a schematic representation of a clinker grinder.
Figure 6:
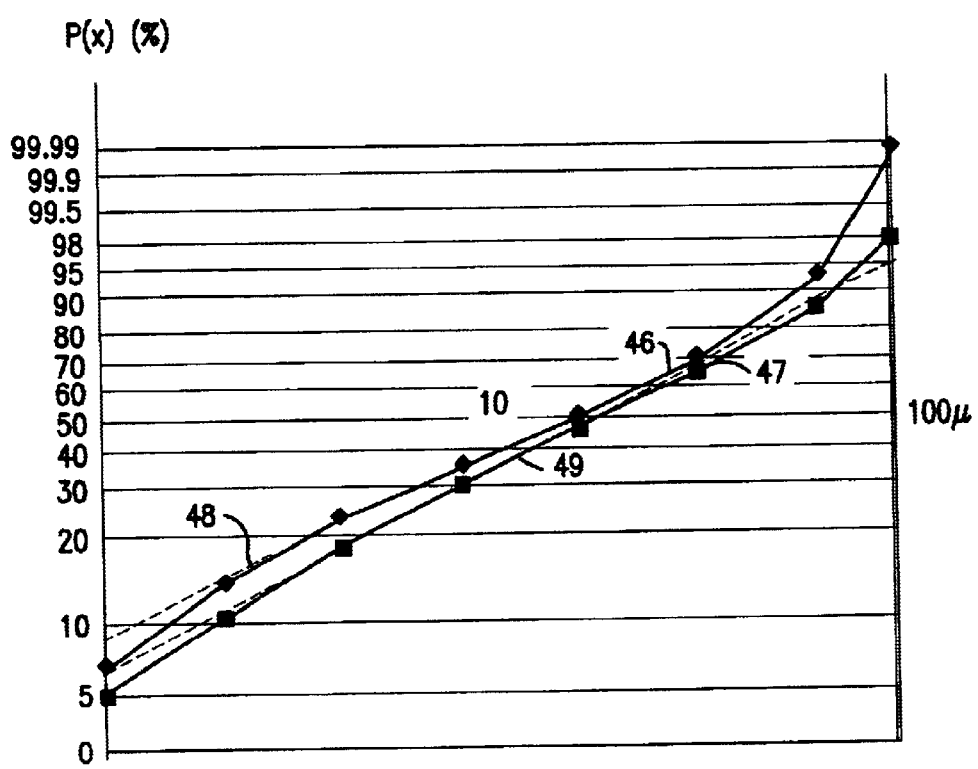
FIG. 6 is an example of representation of the results of a size distribution analysis in a Rosin Rammler diagram.

The grinder 5 is represented in a detailed manner on FIG. 4 and its operating conditions enable controlling the size distribution.

This grinder 21 comprises an inlet 22 and an outlet 23.

The tube 24 of the grinder is a thick sheet metal cylinder divided over its length into chambers, two of which have been represented on FIG. 5: the chamber 25 and the chamber 26. The chambers are separate by partitions 27 drilled with slots 28 used for retaining the grinding load and for letting the material through once it has been ground thinly enough.

The grinding load is made of spherical pebbles 29, 30 and the walls of the grinding tube carry uplifting 31 or sorting 32 shields. The size distribution of the load obtained depends on the diameter of the pebbles 29, 30, the number of chambers 25, 26 as well as the partitions 27 and their slot 28 as well as the filling coefficient of the grinder.

Grinding increases the total surface of the grains and measuring this surface often constitutes a significant criterion for assessing the grinding degree.

As exact measurement of such an area cannot be contemplated, it is generally approached by measuring the specific Blaine surface expressed in $cm^2/g$. This method is divulged in the approved French standard NF-EN-196-6 of August 1990.

Fineness of the cement is measured in the form of mass surface, expressed in $cm^2$ per gram, while monitoring the time taken by a fixed air quantity to travel through a bed of compacted cement with specific sizes and porosity.

The mass surface of the cement is proportional to $\sqrt{t}$ where t is the time necessary to a given air quantity to run through the bed of compacted cement.

The device enabling this measurement is represented on FIG. 5-A. A pressure gauge 33 consists of glass tubes 34 carrying engraved marks 36, 37, 38 and 39. The upper section of the pressure gauge comprises a recess 40, honed and intended for receiving the cell 41 represented on FIG. 5-B. A pear 42 enables creating a depression between the opening 43 of the pressure gauge at atmospheric pressure and the basis of the cell. This depression measured with reference to the marks engraved can be maintained by means of a valve 44.

When measuring, a bed of compacted cement 45, perfectly defined, should be formed, inside the cell 41. This cell is placed inside the recess 40 of the pressure gauge 33. A depression defined and created by the pear 42 is maintained by acting on the valve 44.

Measuring the time necessary to return to pressure balance between both legs of the pressure gauge is characteristic of the cement fineness.

The method for measuring the fineness has been described here succinctly and it should be referred to the standard mentioned above that will provide all the characteristics of the device and the operating mode.

The specific Blaine surface SBS ranges here between 2,000 and 3,000 $cm^2/g$.

The size distributions of the cements are often represented on a Rosin Rammler diagram defined by the standard X 11-635, such as represented as a bilogarithmic co-ordinate.

It is known that the size distribution adheres, according to certain theories, to an exponential law:

The rejection R(x) for a given diameter x is R(x)=1−P(x) where, $$P(x)=1-\exp[-(x/x_o)^n]$$

where $x_o$ is a dimension parameter that corresponds to the value of x for which P=1−1/e.

There results a linear equation from this size distribution while considering the logarithms of both terms of this equation, then again the logarithms of these logarithms. We obtain therefore:

$$\log(-\log(1-P_{(x)})=n(\log x-\log x_o)+\log(\log e)$$

Thus, the size distribution is represented by the value of the gradient of this straight line.

According to the invention, this gradient ranges between 0.75 and 0.90.

Moreover, the cement fineness obtained after grinding is characterised by the mass percentage of particles with diameter greater than this value.

The size distribution is controlled by measuring, in laboratory, samples taken during manufacture.

According to the results of these measurements, we can correct the grinding time, the filling ratio of the grinder and, more generally, the parameters of the grinder.

A major breakthrough of this invention is the making of quality alumina cement not only thanks to these chemical or mineralogical properties, but also by controlling and maximising the size distribution.

art, bear out improved flow value and better final resistance of the products obtained according to the invention, whereas the initial and the final setting remained substantially unchanged, in comparison with the products of the prior art.

|  | Prior art | | | Invention | |
|---|---|---|---|---|---|
|  | Sample 1 | Sample 2 | Sample 3 | Sample 4 | Sample 5 |
| d3/d4 | 1.2 | 1.06 | 1.01 | 1.24 | 1.40 |
| FeO % | 2.5 | 1.2 | 2.1 | 4.5 | 4.74 |
| Reject 90% m | 7 | 7.2 | 2.4 | 3 | 2.7 |
| Rammler gradient | 0.72 | 0.70 | 0.80 | 0.80 | 0.85 |
| Blaine fineness | 3160 | 3260 | 3426 | 3182 | 3135 |
| Initial setting/Final setting (minutes) | 250/290 | 180/240 | 150/180 | 200/240 | 205/295 |
| Flow value % | 100 | 100 | 60 | >150 | 150 |
| Compressive strength 6h (Mpa) | 22 | 42 | 46 | 48 | 21 |
| Compressive strength 24h (Mpa) | 52 | 68 | 57 | 60 | 60 |

The ratio d3/d4 and the firing conditions determine the chemical composition. It enables better stability of the consistency before setting in ready-made products and contributes to the workability of the mortar.

Although the invention cannot be limited by this explanation, it may be assumed that the size distribution determining the apparent surface of the cement, in contact with water during usage, also acts on the hardening and workability conditions. The combination of the mineralogical or chemical properties of the cement and of its size distribution properties enables achieving exceptional result.

Different standardised measuring methods enable quantification of the hardening, in particular the initial and the final setting. The method subject to the approved French standard NF-EN-196-3 of March 1990, known as the Vicat method, has been used therein.

The composition of the mortar is according to the standard NF P15-315, i.e. cement/sand ratio=1/2.7 and water/cement ratio=0.4. The set is measured at 20° C., the samples have been immersed in water or cured at a relative humidity superior to 90%.

Flow value measurements have complied with the standard ASTM-C230-90.

A certain quantity of standardised mortar is applied on a calibrated plate subject to a number (25) of shocks. The flow value of cement is measured after these shocks. The set of parameters of this device is duly specified in the standard mentioned above and this device is calibrated.

Resistance (compressive strength) after 6 hours and 24 hours are measured according to the standard EN 196-1: the test is performed on prisms of 40×40×160 mm, at a temperature of 20° C. Prior to this measurement, the prisms are cured for 24 hours at a relative humidity superior to 90%, then immersed in water till the measurement.

EXAMPLES

The examples hereunder, in which the samples complying with the invention are compared with samples of the prior

What is claimed is:

1. An alumina cement mixture comprising:
   a mixture of alumina oxide $Al_2O_3$, —A—, and lime CaO, —C—, wherein,
   the concentration d3 in alumina $Al_2O_3$, —A— and the concentration d4 in lime CaO, —C— in the mixture are such that d3/d4 ranges between 1.15 and 1.40, and a size distribution of the mixture, represented in a Rosin Rammier diagram, has a gradient ranging between 0.75 and 0.90,
   wherein the concentration d3 represents the percentage by weight of $Al_2O_3$ in the intial mixture, and the concentration d4 represents the percentage by weight of CaO in the initial mixture.

2. A method for making alumina cement in which a batch composition is obtained, comprising the following steps:
   mixing bauxite and limestone to obtain an initial mixture,
   baking the initial mixture, in a furnace, to produce a clinker containing aluminium oxide $Al_2O_3$, —A—, and lime CaO, —C—, partially as $C_{12}A_7$ and partially as CA, the concentration d3 in aluminium oxide $Al_2O_3$, —A—, and the concentration d4 in lime CaO, —C—, in the initial mixture being such that d3/d4 ranges between 1.15 and 1.40, and
   grinding the clinker with any secondary constituents, to produce a cement size distribution, as represented in a Rosin Rammler diagram, that has a gradient ranging between 0.75 and 0.90,
   wherein the concentration d3 represents the percentage by weight of $Al_2O_3$ in the intial mixture, and the concentration d4 represents the percentage by weight of CaO in the initial mixture.

3. A method according to claim 2, characterised in that the Blaine fineness of the cement ranges between 2,000 and 5,000 $cm^2/g$.

4. A method according to claim 2, characterised in that the Blaine fineness of the cement is around 3,500 $cm^2/g$.

5. A method according to claim 2, characterised in that the furnace is a reverberatory furnace.

6. A method according to claim 2, characterised in that the furnace is an electrical furnace.

* * * * *

UNITED STATES PATENT AND TRADEMARK OFFICE
CERTIFICATE OF CORRECTION

PATENT NO. : 6,689,207 B2
DATED : February 10, 2004
INVENTOR(S) : Bruno Espinosa et al.

It is certified that error appears in the above-identified patent and that said Letters Patent is hereby corrected as shown below:

<u>Title page,</u>
Item [73], amend to read as follows:

-- [73] Assignee: Lafarge Aluminates, Paris (FR) --.

Signed and Sealed this

Twentieth Day of April, 2004

JON W. DUDAS
*Acting Director of the United States Patent and Trademark Office*